UNITED STATES PATENT OFFICE.

MAURICE CERESOLE, OF NEUVILLE-SUR-SAÔNE, FRANCE, ASSIGNOR TO THE BADISCHE ANILIN AND SODA FABRIK, OF LUDWIGSHAFEN, GERMANY.

RHODAMIN DYE.

SPECIFICATION forming part of Letters Patent No. 516,589, dated March 13, 1894.

Application filed March 17, 1892. Serial No. 425,319. (Specimens.) Patented in France August 24, 1891, No. 215,700.

*To all whom it may concern:*

Be it known that I, MAURICE CERESOLE, doctor of philosophy, a citizen of the Swiss Republic, residing at Neuville-sur-Saône, in the Department of the Rhône, France, have invented new and useful Improvements in the Manufacture of Rhodamin Dyes, (for which I have obtained a patent in France, No. 215,700, dated August 24, 1891,) of which the following is a specification.

This invention is based on the discovery that the tetra-alkylated rhodamins can by suitable means be converted into new dyestuffs possessing properties differing in many respects from, and giving in each case yellower shades of color than the dyes from which they are derived. This conversion of tetra-alkylated rhodamins into the new dyes is the result of a chemical change in the former which consists in the splitting off of one or more of the alkyl groups. This can be expressed by the following equations taking as instances a rhodamin of the phthalic acid series and one derived from succinic acid:

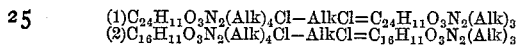

where Alk stands for ethyl or methyl. This effect can be brought about in various ways, such as for instance by heating the tetra-alkyl-rhodamin alone; or by heating it with an indifferent diluent such as naphthalene; or by heating it with a diluting material such as anilin hydrochlorate which acts partly as a solvent and partly as a chemical reagent in that it combines with the alkyl and forms alkylated anilin compounds; or by heating it with suitable inorganic salts as zinc chlorid. In each case the reaction must be suitably moderated and interrupted when the desired shade is obtained. A prolonged treatment gives less valuable or worthless results.

The tetra-alkyl-rhodamins which have hitherto yielded the most valuable results are tetra-ethyl-rhodamin from phthalic acid and tetra-methyl-rhodamin from succinic acid but the process is applicable to the other tetra-alkyl-rhodamin of these series and to those of the benzo-rhodamin, formic acid and other series. By this application I do not intend to claim generally the coloring matters resulting from the application of said process to any tetra-alkylated rhodamin of any series which form the subject matter of a separate application bearing even date with this but solely that particular dyestuff which results from the application of said process to tetra-methyl rhodamin from succinic acid.

This specific product dyes both silk and cotton in yellower shades of red than the dye from which it is obtained and appears well suited for dyeing mixed silk and cotton goods; it also has the valuable property of dyeing cotton not only with the aid of a mordant, but also in a substantive manner without previous preparation of the fiber.

The following directions for obtaining my new yellowish rhodamin from the tetra-methyl-rhodamin of the succinic acid series will serve to illustrate the nature of my invention and the manner of carrying it into effect. The parts are by weight.

Example: Mix together about three (3) parts of the aforesaid tetra-methyl rhodamin of the succinic acid series with about three (3) parts of anilin hydrochlorate in an enameled vessel furnished with a stirrer, and melt the mixture by heating gradually to about one hundred and ninety degrees centigrade (190° C). Stir well and maintain this temperature for about one hour and three quarters. When this point is reached allow to cool, dissolve the mass in hot water, rendered slightly acid with hydrochloric acid and precipitate with common salt solution, repeat this purification as often as is necessary and finally recrystallize from hot water slightly acidified with hydrochloric acid.

In applying my new process of dealkylation or splitting off alkyl groups to any tetra-alkyl-rhodamin as herein before mentioned, the course of the reaction and the point when it should be interrupted can be ascertained by drawing samples of the product from time to time, working up and making experimental dye tests. The heating is continued in each case until the desired shade is obtained. A short period of heating results in the production of shades redder than those which can be obtained by more prolonged heating and if the heating be too prolonged, the product obtained is impure and has not the desired solubility in water. My new dyestuff, the partially dealkylated tetra-alkyl rhodamin is thus obtained in the form of its hydrochloric acid salt, it possesses all the generic properties of dealkylated tetra-alkylated rhodamins, thus, it occurs as a dark colored crystalline powder, it is soluble in water giving a red solution with a greenish fluorescence; it is practically insoluble in ether and benzene. Caustic soda throws down a precipitate from the strong aqueous solution and this can be taken up by ether giving a practically colorless or very slightly colored solution; on adding hydrochloric acid and water the intensely red color is regenerated. It dissolves in concentrated sulphuric acid giving an intensely yellow to orange solution which on dilution turns red. It dyes silk and cotton in yellower shades than the tetra-alkyl-rhodamin from which it is obtained. It is distinguished from other dealkylated rhodamins by the following specific characteristics: the red solution it gives in water is of a brownish shade and possesses a greenish fluorescence; it is but slightly soluble in dilute hydrochloric acid so that it is readily precipitated thereby from its aqueous solutions, thus if a little dilute hydrochloric acid be added to a dye solution containing about one part dye to three hundred parts water, a copious precipitate forms at once.

The free base is very insoluble in alkaline water thus if a similar dye solution (1:300) be treated with a little dilute caustic soda solution, a copious precipitate forms and the solution loses color.

The dealkylated rhodamin obtained as hereinbefore described consists essentially of a body which appears to have the composition represented by the formula:—

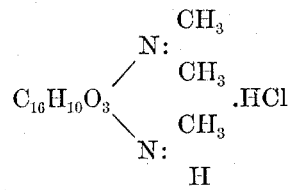

What I claim as new, and desire to secure by Letters Patent, is—

As a new article of manufacture, the new dyestuff, (partially dealkylated tetra-methyl-rhodamin of the succinic acid series) which in the form of its hydrochloric acid salt is a dark colored crystalline powder soluble in water and in alcohol but practically insoluble in ether and benzene; it is easily precipitated by hydrochloric acid from even dilute solutions and its free base is also very insoluble in alkaline water all substantially as described.

In testimony whereof I have hereunto set my hand in the presence of two subscribing witnesses.

MAURICE CERESOLE.

Witnesses:
  GEO. D. FAIRFIELD,
  C. A. HAUSMANN.